(12) United States Patent
Birman et al.

(10) Patent No.: US 7,575,331 B2
(45) Date of Patent: Aug. 18, 2009

(54) COMPENSATION FREE ILLUMINATION OF INSTRUMENT CLUSTER DISPLAY

(75) Inventors: Vyacheslav B. Birman, Auburn Hills, MI (US); Werner Eckardt, Rochester, MI (US); Francisco Ramirez-Aldana, Guadalajara (MX)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 174 days.

(21) Appl. No.: 11/605,592

(22) Filed: Nov. 28, 2006

(65) Prior Publication Data

US 2007/0139905 A1    Jun. 21, 2007

Related U.S. Application Data

(60) Provisional application No. 60/751,072, filed on Dec. 15, 2005.

(51) Int. Cl.
*G01D 13/28* (2006.01)

(52) U.S. Cl. .............................. 362/27; 362/26; 362/29; 362/471; 362/489; 362/488; 362/511; 362/518; 362/309; 362/297; 362/559; 362/327; 362/347; 313/512

(58) Field of Classification Search ................. None
See application file for complete search history.

(56) References Cited

U.S. PATENT DOCUMENTS

| | | | | |
|---|---|---|---|---|
| 1,644,277 A | * | 10/1927 | Rodanet | ..................... 362/489 |
| 2,413,848 A | * | 1/1947 | Simpson | ...................... 362/29 |
| 4,258,643 A | | 3/1981 | Ishikawa et al. | |
| 4,274,358 A | | 6/1981 | Nakamura et al. | |
| 5,084,698 A | * | 1/1992 | Sell | .............. 345/83 |
| 5,130,897 A | | 7/1992 | Kuzma | |
| 5,199,376 A | | 4/1993 | Pasco | |
| 5,915,822 A | | 6/1999 | Ogura et al. | |
| 5,984,485 A | | 11/1999 | Poli et al. | |
| 6,025,820 A | | 2/2000 | Salmon et al. | |
| 6,065,846 A | * | 5/2000 | Kato et al. | ..................... 362/30 |
| 6,174,064 B1 | | 1/2001 | Kalantar et al. | |
| 6,179,429 B1 | | 1/2001 | Sheldon et al. | |
| 6,276,809 B1 | * | 8/2001 | Matsumoto | .................. 362/26 |

(Continued)

FOREIGN PATENT DOCUMENTS

EP    0736416    10/1996

(Continued)

OTHER PUBLICATIONS

Definition of Lobe. Retrived Feb. 10, 2009. Dictionary.com (http://dictionary.reference.com/browse/lobe). Definition cited from the Random House Dictionary, copywrite Random House, INc. 2006.*

(Continued)

*Primary Examiner*—Bao Q Truong
*Assistant Examiner*—Danielle Allen

(57) ABSTRACT

An example light guide assembly for illuminating a display of an instrument cluster includes a light receiving portion, a light propagating portion and a conical surface positioned between the light receiving portion and the light propagating portion. An exterior surface of the light propagating portion includes a plurality of lobes that uniformly illuminate the display as light propagates from the light receiving portion to the conical surface and through the light propagating portion.

11 Claims, 5 Drawing Sheets

U.S. PATENT DOCUMENTS

| | | | |
|---|---|---|---|
| 6,470,822 | B2 | 10/2002 | Adams et al. |
| 6,572,235 | B1 | 6/2003 | Neugart et al. |
| 6,595,667 | B1 * | 7/2003 | Obata .................. 362/489 |
| 6,626,549 | B2 | 9/2003 | Fujita et al. |
| 6,955,438 | B2 | 10/2005 | Ishii |
| 6,959,995 | B2 | 11/2005 | Ikarashi et al. |
| 6,979,094 | B1 | 12/2005 | Venkatram |
| 7,093,948 | B2 | 8/2006 | Fong et al. |
| 7,160,010 | B1 * | 1/2007 | Chinniah et al. ............ 362/511 |
| 7,295,448 | B2 | 11/2007 | Zhu |
| 2006/0144318 | A1 | 7/2006 | Balsfulland et al. |

FOREIGN PATENT DOCUMENTS

| | | |
|---|---|---|
| EP | 0736416 A1 | 10/1996 |
| EP | 1132721 A1 | 9/2001 |
| EP | 1182395 A2 | 2/2002 |
| EP | 1298382 A1 | 4/2003 |
| WO | 2005002903 | 1/2005 |
| WO | 2005002903 A1 | 1/2005 |

OTHER PUBLICATIONS

Slope Formula. Retrieved Feb. 10, 2009. (http://math.about.com/library/blslope.htm).*
Partial International Search Report dated Nov. 12, 2007 relating to International Application No. PCT/US2006/061718.
International Search Report and Written Opinion of the International Searching Authority for International Application No. PCT/US2006/061718 mailed Mar. 4, 2008.

* cited by examiner

COMPENSATION FREE ILLUMINATION OF INSTRUMENT CLUSTER DISPLAY

CROSS-REFERENCE TO RELATED APPLICATIONS

This application claims priority to U.S. Provisional Application No. 60/751,072, filed Dec. 15, 2005.

BACKGROUND OF THE INVENTION

The present invention relates to a vehicle instrument cluster, and more particularly to a light guide assembly for an illuminated display that increases light efficiency.

An instrument cluster for a vehicle is traditionally located on a vehicle dashboard and includes several displays or dials that indicate various vehicle operating conditions. For example, an instrument cluster may include a speedometer, a tachometer, an engine condition indicator, and other known types of gauges. These gauges are illuminated to facilitate reading of the information by the vehicle occupants.

Instrument clusters include a printed circuit board (PCB) with electronic components for controlling operation of the instrument clusters. Light sources, such as light emitting diodes (LEDs), are typically mounted to the PCB. A light housing is used to contain the light produced by the light sources inside the instrument cluster and prevent unwanted light leakage. The instrument cluster further includes a display or dial on which the graphical image is formed or mounted.

The instrument cluster may include a light guide formed as a piece of clear material which channels the light received from the light source and redistributes the light over the display. Disadvantageously, known light guides have not satisfactorily provided uniform distribution of light over the entire display. In addition, an increased number of light sources may be required to provide the desired uniform light distribution.

The use of compensation is known for providing evenly distributed illumination over the entire display of the instrument cluster. Compensation is achieved by darkening the bright spots of the dial to the level of the darkest spot of the dial. This requires the application of a coating to the display or dial to absorb light in certain areas. Disadvantageously, the light efficiency provided by an instrument cluster utilizing compensation may be poor because a large quantity of light produced by the light source is absorbed by the compensation layer.

Accordingly, it is desirable to provide a vehicle instrument cluster that increases the efficiency of light utilized for illuminating a display while providing compensation free display illumination.

SUMMARY OF THE INVENTION

An example light guide assembly for illuminating a display of an instrument cluster includes a light receiving portion, a light propagating portion and a conical surface between the light receiving portion and the light propagating portion. An exterior surface of the light propagating portion includes a plurality of lobes that uniformly illuminate the instrument cluster surface as light propagates from the light receiving portion to the conical surface and through the light propagating portion.

An example illuminated instrument cluster includes a display having a graphical image, a pointer moveable relative to the graphical image, a light source, a circuit board supporting the light source, a light guide, and a light housing having a reflective surface that extends between the circuit board and the display. The reflective surface includes a negative sloped section and a positive sloped section.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
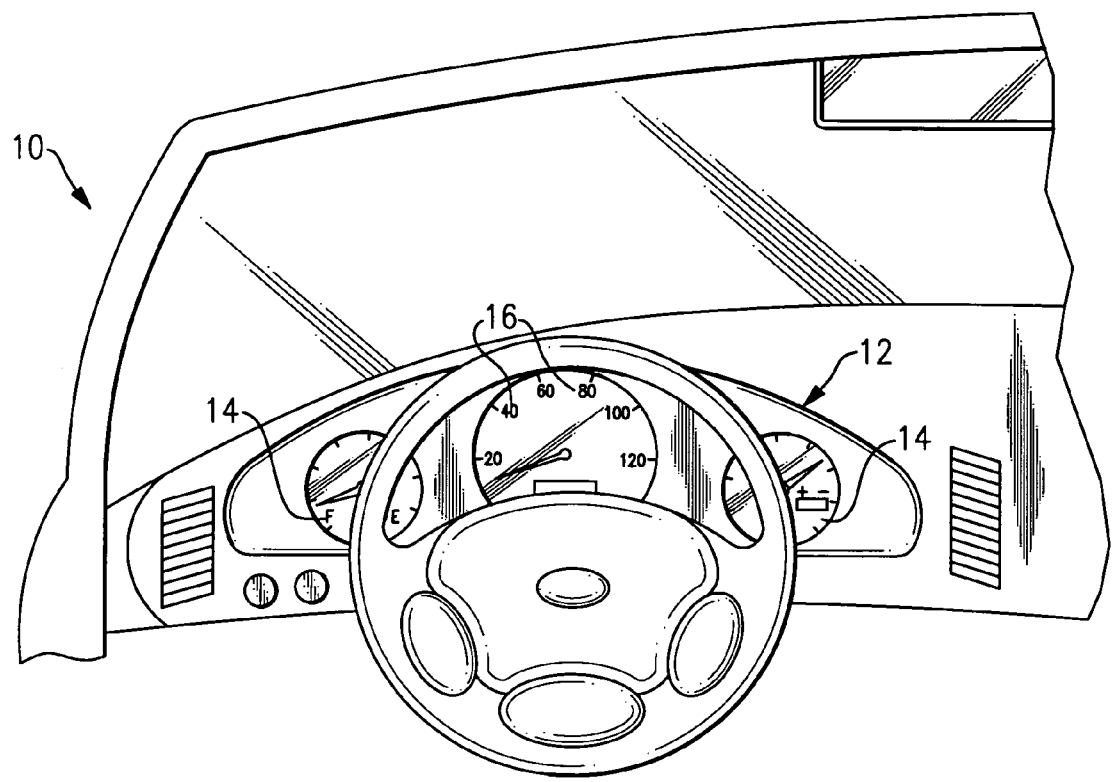
FIG. 1 illustrates selected portions of a vehicle having an example instrument cluster.

FIG. 1 illustrates selected portions of a vehicle 10 having an instrument cluster 12, such as a vehicle gauge cluster, that communicates vehicle information to occupants of the vehicle 10. In the illustrated example, the instrument cluster 12 includes a vehicle display 14 having a plurality of graphics 16, such as numbers, letters, or symbols. At least a portion of the vehicle graphics 16 are illuminated from within the instrument cluster 12 for nighttime viewing or for aesthetic purposes, for example.

Figure 2:
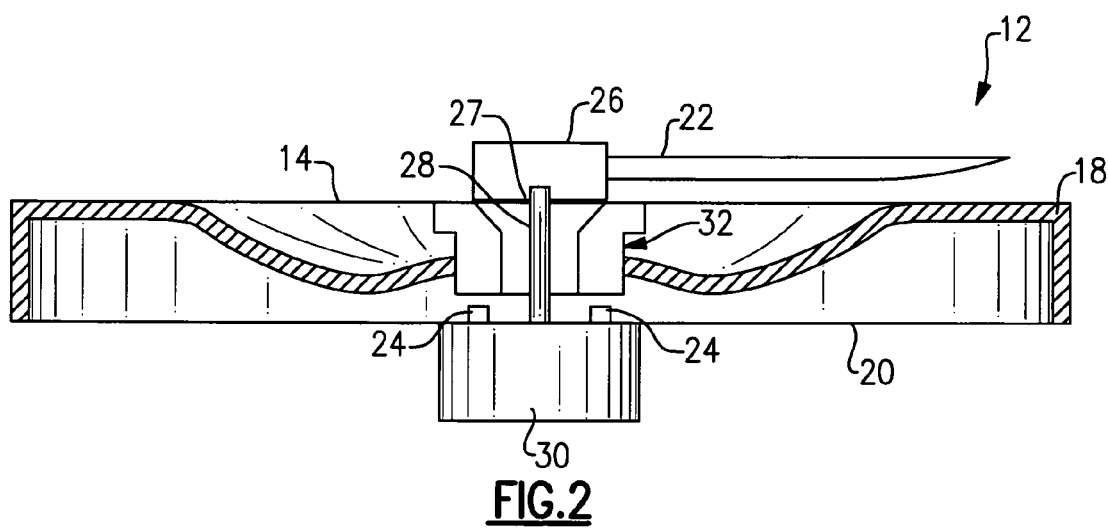
FIG. 2 illustrates a cross-sectional view of the example instrument cluster illustrated in FIG. 1.

FIG. 2 shows selected portions of the example instrument cluster 12, including a light housing 18 that supports the display 14 and a circuit board 20, such as a printed circuit board (PCB). A pointer 22 is mounted to the circuit board 20 for movement relative to the display 14 and is used to indicate the current status of the vehicle operating condition. The circuit board 20 also includes a light source 24, such as a light emitting diode (LED), for illuminating the display 14 and the pointer 22. However, other lighting types are contemplated as within the scope of the present invention.

When the instrument cluster 12 is assembled, the light sources 24 are mounted to the circuit board 20 and are aligned adjacent to a center 27 of the display 14. In one example, the light sources 24 are at least partially aligned with a housing 26 of the pointer 22. However, the light sources 24 may be positioned at other locations within the instrument cluster 12.

The pointer 22 is driven by a shaft 28 of a motor 30, such as a stepper motor, and is rotated to a desired position relative to the display 14 including the vehicle graphics 16. When activated, the light source 24 emits light. A light guide 32 receives the light from each light source 24, and uniformly disperses the light across the display 14 to evenly illuminate the vehicle graphics 16 of the display 14, as is further discussed below.

Figure 3:
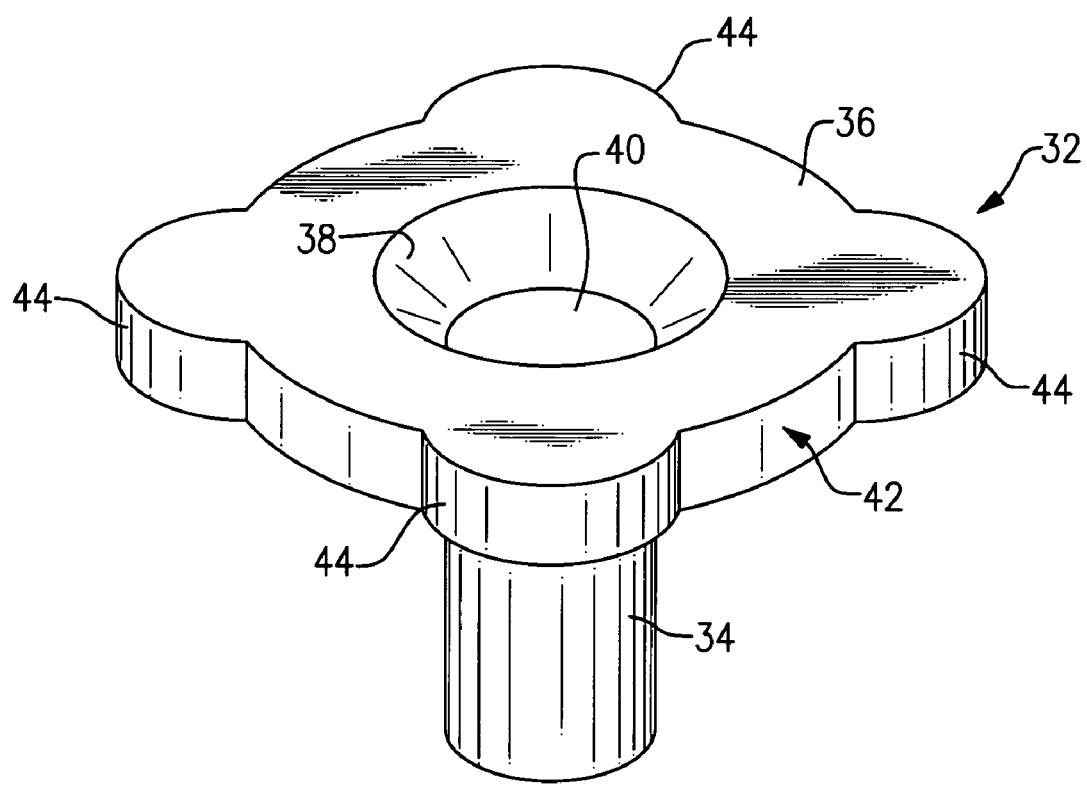
FIG. 3 illustrates a perspective view of an example light guide having a plurality of lobes.

FIG. 3 illustrates an example light guide 32. The light guide 32 is formed from a transparent material, such as clear plastic, for example. The light guide 32 includes a light receiving portion 34, a light propagating portion 36 and a conical surface 38.

The light receiving portion 34 is disposed transverse to the display 14 where the light guide 32 is positioned within the instrument cluster 12 (See FIG. 5), in one example. In another example, the light receiving portion 34 is disposed within the instrument cluster 12 perpendicular to the display 14. The light propagating portion 36 is transverse to the light receiving portion 34 in one example, and in one embodiment is perpendicular to the light receiving portion 34. The conical surface 38 extends between the light receiving portion 34 and the light propagating portion 36. In one example, the conical surface 38 is inclined to direct light from the light receiving portion 34 to the light propagating portion 36.

An aperture 40 extends through the center of the light receiving portion 34. In one example, the light receiving portion 34 and the light propagating portion 36 are substantially cylindrical in shape. However, the actual size, shape and configuration of the light receiving portion 34 and the light propagating portion 36 will vary depending upon design specific parameters, including the design requirements of the instrument cluster 12.

Figure 4:
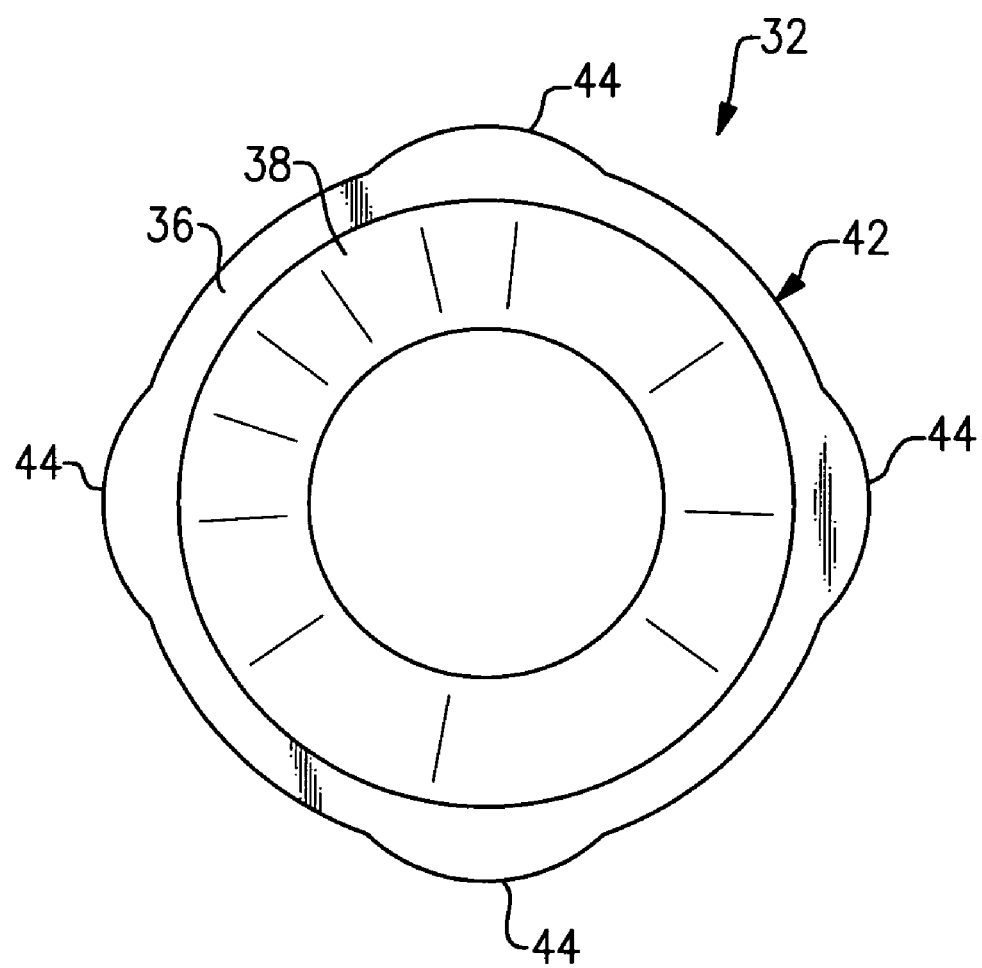
FIG. 4 illustrates a top view of the example light guide illustrated in FIG. 3.

FIG. 4 shows an exterior surface 42 of the light propagating portion 36 including a plurality of lobes 44. In one example, the plurality of lobes 44 are positioned circumferentially about the exterior surface 42. In another example, the plurality of lobes 44 are spaced equidistantly about the exterior surface 42. In yet another example, the lobes 44 include a crescent shape.

In the illustrated example, the exterior surface 42 includes four lobes 44. The number and position of the lobes 44 corresponds with the number of light sources 24. The actual number, positioning and shape of the lobes 44 will vary depending upon design specific parameters, including the size of the instrument cluster 12 and the number of light sources 24 utilized. The lobes 44 control the light which escapes the light guide 32 to provide an even illumination distribution of the light on the display 14.

Figure 5:
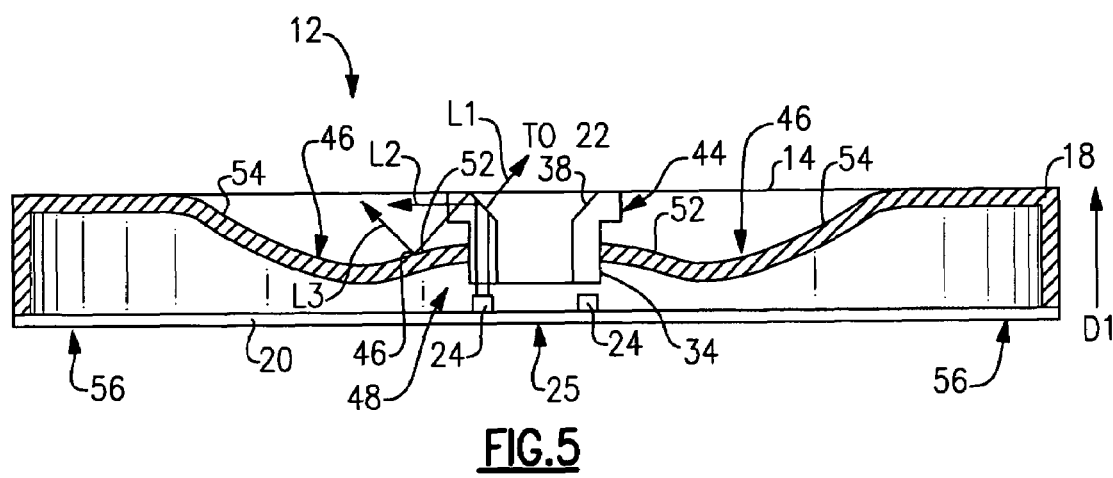
FIG. 5 illustrates a cross-sectional view of an example instrument cluster including a light housing and the example light guide illustrated in FIG. 3.

In the example illustrated in FIG. 5, the light housing 18 of the instrument cluster 12 includes a reflective surface 46, which extends between the circuit board 20 and the display 14. The reflective surface 46 extends circumferentially about a center 25 of the circuit board 20.

In one example, the light housing 18 includes a negative sloped section 52 and a positive sloped section 54. The negative sloped section 52 is positioned adjacent to a center 25 of the circuit board 20 and the positive sloped section 54 is positioned adjacent to an outer periphery 56 of the circuit board 20. In one example, the negative sloped section 52 extends from a center of the light housing 18 toward the circuit board 20 at an angle of approximately 5°. In another example, the negative sloped section 52 extends from the center of the light housing 18 toward the circuit board 20 at an angle of approximately 10°. In yet another example, the angle of the negative sloped section 52 is between 1° to 10°. The actual angle of slope of the negative sloped section 52 will vary depending upon design specific parameters, including the number of light sources 24 utilized and the size of the instrument cluster 12. The positive sloped section 54 extends between the negative sloped section 52 and the display 14.

The area of the light housing 18 which is closest to the light sources 24 receives a greater amount of illumination than the area of the light housing 18 further distanced from light sources 24. The negative sloped section 52 absorbs an increased amount of light near the light sources 24 because of its slope. Therefore, even illumination of the display 14 is provided without the need to provide compensation on either the reflective surface 46 or the display 14.

A light source 24 is mounted to the circuit board 20 and positioned adjacent each lobe 44 of the light guide 32. That is, at least one light source 24 is associated with each lobe 44 provided on the light guide 32. Light from each light source 24 is emitted into the light receiving portion 34 in a direction D1, which is transverse to the display 14. In one example, the direction D1 is perpendicular to the display 14. A portion of the light L1 propagates up through the light guide 32 and illuminates the pointer. A second portion of the light L2 reflects off of the conical surface 38 of the light guide 32 and directly illuminates the display 14. A third portion of the light L3 reflects off of the reflective surface 46 of the light housing 18 and subsequently illuminates the display 14.

In one example, the light L3 reflects off of the negative sloped section 52 of the reflective surface 46. In another example, the light L3 reflects off the positive sloped section 54. In yet another example, the light L3 reflects off each of the negative sloped section 52 and the positive sloped section 54 to illuminate the display 14.

The example configuration of the instrument cluster 12 provides for the simultaneous illumination of both the pointer 22 and the display 14. In addition, the lobes 44 of the light guide 32 provide increased light efficiency by more efficiently distributing the light from the light sources 24, and enable a reduction of the number of light sources needed to effectively illuminate the instrument cluster 12. The negative sloped section 52 of the reflective surface 46 of the light housing 18 provides even illumination of the display 14 without the need to provide compensation on the display 14 of the light housing 18.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

What is claimed is:

1. An illuminated instrument cluster comprising:
 a display including at least one vehicle graphic;
 at least one pointer moveable relative to said at least one vehicle graphic;
 at least one light source positioned to illuminate at least a portion of said at least one vehicle graphic;
 a circuit board supporting said at least one light source;
 at least one light guide for directing light from said at least one light source to each of said at least one pointer and said display;
 at least one light housing supported by said circuit board and including at least one reflective surface extending between said circuit board and said display, wherein said at least one reflective surface includes a negative sloped section and a positive sloped section; and
 wherein said at least one reflective surface extends circumferentially about a center of said circuit board, said negative sloped section positioned adjacent said center of said circuit board and said positive sloped section positioned adjacent a periphery of said circuit board.

2. The cluster as recited in claim 1, wherein said positive sloped section extends between said negative sloped section toward said display.

3. The cluster as recited in claim 1, wherein said at least one light source includes a light emitting diode.

4. The assembly as recited in claim 1, wherein said negative sloped section includes a varying slope.

5. The cluster as recited in claim 1, wherein said at least one light guide includes a light receiving portion, a light propagating portion and a conical surface between said light receiving portion and said light propagating portion.

6. The cluster as recited in claim 5, wherein an exterior surface of said light propagating portion includes a plurality of lobes that uniformly illuminate said display as light propagates from said light receiving portion to said conical surface and through said light propagating surface.

7. The cluster as recited in claim 5, wherein a portion of said light from said at least one light source bypasses said conical surface and is directed within said pointer.

8. The cluster as recited in claim 5, wherein at least a portion of said light from said at least one light source is directed into said light receiving portion, reflects off said conical surface and is directed into said light propagating surface prior to exiting said at least one light guide.

9. The cluster as recited in claim 8, wherein a portion of said light which exits said at least one light guide reflects off said at least one reflective surface to illuminate said display.

10. The cluster as recited in claim 8, wherein a portion of said light which exits said at least one light guide directly illuminates said display.

11. An illuminated instrument cluster comprising:
a display including at least one vehicle graphic;
at least one pointer moveable relative to said at least one vehicle graphic;
at least one light source positioned to illuminate at least a portion of said at least one vehicle graphic;
a circuit board supporting said at least one light source;
at least one light guide for directing light from said at least one light source to each of said at least one pointer and said display;
at least one light housing supported by said circuit board and including at least one reflective surface extending between said circuit board and said display, wherein said at least one reflective surface includes a negative sloped section and a positive sloped section; and
wherein said negative sloped section extends from a center of said at least one light housing toward said circuit board.

\* \* \* \* \*